(12) United States Patent
Osakabe et al.

(10) Patent No.: US 7,892,298 B2
(45) Date of Patent: Feb. 22, 2011

(54) METHOD FOR PRODUCING HIGH PURITY CAUSTIC POTASH

(75) Inventors: Tsugiyoshi Osakabe, Nagoya (JP); Sei Imayoshi, Nagoya (JP); Mitsuharu Hamamori, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 561 days.

(21) Appl. No.: 11/990,213

(22) PCT Filed: Aug. 8, 2006

(86) PCT No.: PCT/JP2006/315638

§ 371 (c)(1),
(2), (4) Date: Feb. 8, 2008

(87) PCT Pub. No.: WO2007/018203

PCT Pub. Date: Feb. 15, 2007

(65) Prior Publication Data

US 2009/0110629 A1 Apr. 30, 2009

(30) Foreign Application Priority Data

Aug. 11, 2005 (JP) ............................. 2005-233666

(51) Int. Cl.
*C01D 1/30* (2006.01)

(52) U.S. Cl. ...................................... 23/303; 23/295 R

(58) Field of Classification Search ............. 23/303, 23/295 R

See application file for complete search history.

(56) References Cited

FOREIGN PATENT DOCUMENTS

| | | | |
|---|---|---|---|
| JP | 62-100409 | A | 5/1987 |
| JP | 1-246124 | A | 10/1989 |
| JP | 1-246125 | A | 10/1989 |
| JP | 2000-203828 | A | 7/2000 |
| JP | 2002-317286 | A | 10/2002 |
| JP | 2004-203713 | A | 7/2004 |
| JP | 2005-001955 | A | 1/2005 |

*Primary Examiner*—Edward M Johnson
(74) *Attorney, Agent, or Firm*—Birch, Stewart, Kolasch & Birch, LLP

(57) ABSTRACT

The present invention contemplates for providing a producing method which can give highly pure caustic potash in a relatively simple process, in response to the above-described demand for increased high purity in caustic potash.

A method to give highly pure caustic potash containing almost no impurities of sodium, chlorine, and heavy metals, such as iron, chromium and nickel, through crystallization, by bringing an aqueous caustic potash solution having a sodium content of 200 mg/kg or less and a chlorine content of 15 mg/kg or less when calculated in terms of a weight of potassium chloride, in which a caustic potash concentration of 48% is to be a standard, into a high temperature state.

12 Claims, 1 Drawing Sheet

METHOD FOR PRODUCING HIGH PURITY CAUSTIC POTASH

TECHNICAL FIELD

The present invention relates to a purifying method which can give highly pure caustic potash (potassium hydroxide), and the present invention provides a method which can give highly pure caustic potash at low cost and in a simple process by removing, for example, sodium and chlorine, as well as heavy metals, such as iron, chromium and nickel, from the caustic potash to be treated.

BACKGROUND ART

In general, caustic potash is produced, accompanied by chlorine or hydrogen, through electrolysis of an aqueous potassium chloride solution with an ion exchange membrane method or the like. The thus-produced potassium hydroxide has a good purity, and thus can be used in many fields. Such potassium hydroxide is used as an inorganic chemical material indispensable in daily activities in many fields, for example, production of various types of potassium salts, as well as medical and pharmaceutical products, cosmetics, and analyzing reagents. Among those, a highly pure product from which impurities are removed to a specific degree is required in such fields as battery/cell materials, electronic materials, and medicine. In recent years, highly pure caustic potash containing an extremely small amount of sodium components and impurity metals has been required for chemical mechanical polishing of silicon substrates for use, for example, in LSIs, in order to prevent impurities from entering and contaminating the silicon substrate to be highly integrated. Further, it is necessary, for example, in alkaline batteries/cells to prevent the stability in terms of voltage and the like from lowering over a long period of time, and prevent liquid from leaking, due to heavy metal components or chloride ions in caustic potash. In view of the above, a highly pure caustic potash product has been in demand.

In response to this demand for increased high purity in caustic potash, there are disclosed methods for purifying potassium hydroxide in which an electrolysis chamber is modified or crystallization is used (see, for example, Patent Documents 1 and 2). Further, there is also disclosed a method for obtaining highly pure caustic potash by purifying potassium chloride before subjecting to electrolysis (for example, Patent Document 3). However, in the methods for obtaining caustic potash through electrolysis, low sodium caustic potash can be obtained using low sodium potassium chloride as a material to be treated, but it is necessary to obtain a large amount of low sodium potassium chloride. Therefore, the methods for obtaining caustic potash through electrolysis are disadvantageous in view of costs, in comparison with purification through crystallization. Further, crystallization through cooling is disadvantageous in view of costs, in comparison with crystallization from a high temperature state, taking concentrating and cooling of the mother liquor into consideration.

Further, as a purifying method utilizing, for example, the difference in solubility, there is disclosed a method for increasing the purity of aluminum chloride, by repeating a crystallization operation in many steps in which crystallizers are arranged in series (for example, Patent Document 4). The costs for purification in this case greatly differ, depending on the yield of the purified product, in addition to the properties of the purifying method.

It is known that such metal components as iron and nickel remain on the surface of a silicon wafer when the silicon wafer is etched, thereby to change the electrical properties. Therefore, it is desired that the content thereof is low. Thus, there is disclosed a method for reducing the nickel content to 0.05 ppm or lower, using a filtering apparatus where activated charcoal is pre-coated (for example, Patent Document 5). Further, there is disclosed a method for reducing the iron content to 200 ppb or lower and the nickel content to 20 ppb or lower, by bringing caustic soda into contact with activated charcoal that has been activated through immersion in nitric acid (for example, Patent Document 6).

Patent Document 1: JP-B-3-061605 ("JP-B" means examined Japanese patent publication)
Patent Document 2: JP-B-5-082328
Patent Document 3: JP-A-2002-317286 ("JP-A" means unexamined published Japanese patent application)
Patent Document 4: JP-A-2004-203713
Patent Document 5: JP-A-2000-203828
Patent Document 6: JP-A-2005-001955

DISCLOSURE OF INVENTION

Problem which the Invention is to Solve

The present invention contemplates for providing a producing method which can give highly pure caustic potash in a relatively simple process, in response to the above-described demand for increased high purity in caustic potash.

Means to Solve the Problem

The inventors of the present invention, keenly studying a method of obtaining highly pure caustic potash, have found that highly pure caustic potash which contains almost no impurities of sodium, chlorine, and heavy metals, such as iron, chromium and nickel, can be obtained through crystallization from an aqueous caustic potash solution in a high temperature state, and thus we have completed the present invention.

That is, the present invention is directed to:

(1) A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% is to be a standard, in a high temperature state, thereby to allow caustic potash monohydrate crystals to be deposited; and isolating the crystals from a slurry containing said monohydrate crystals;

(2) The method of producing highly pure caustic potash according to the above 1, wherein the aqueous caustic potash solution has a sodium content of more than 10 mg/kg, in which the caustic potash concentration of 48% is to be a standard;

(3) The method of producing highly pure caustic potash according to the above 1 or the above 2, wherein the aqueous caustic potash solution has a chlorine content of more than 1 mg/kg when calculated in terms of a weight of potassium chloride, in which the caustic potash concentration of 48% is to be a standard;

(4) The method of producing highly pure caustic potash according to any of the above 1 to 3, wherein the thus-isolated crystals are rinsed with water or an aqueous caustic potash solution;

(5) The method of producing highly pure caustic potash according to any of the above 1 to 4, wherein the high temperature state is at a temperature higher than 70° C. but not higher than 150° C.;

(6) The method of producing highly pure caustic potash according to any of the above 1 to 5, wherein a caustic potash concentration in a mother liquid in a crystallizer is 57% to 70%;

(7) The method of producing highly pure caustic potash according to any of the above 4 to 6, wherein the crystals are rinsed with an amount of liquid whose amount is ⅓ to 1/200 times the amount of said crystals; and (8) The method of producing highly pure caustic potash according to any of the above 1 to 7, wherein the mother liquid resulting from the slurry containing the monohydrate crystals according to any of the above 1 to 3 from which the crystals are separated off and/or the rinsing liquid according to the above 4 is reused, with adjusting the caustic potash concentration to be 49% to 65%.

EFFECTS OF THE INVENTION

By using the highly pure caustic potash obtained by the production method of the present invention, the required performance can be met for silicon wafers after chemically and mechanically polishing, and, in alkaline cells/batteries and the like, the voltage or the like can be stabilized and liquid leakage can be prevented from being occurred.

DESCRIPTION OF NUMERICAL SYMBOLS

Figure 1:
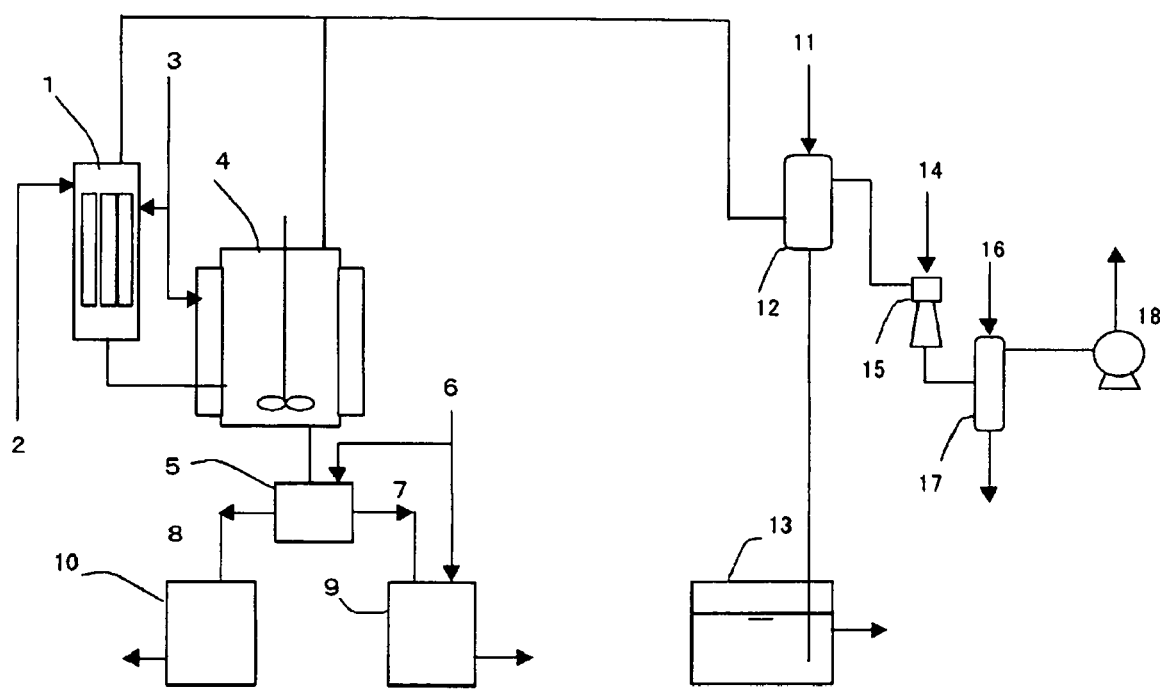
FIG. 1 is a schematic diagram showing an apparatus to which the method of the present invention of producing highly pure caustic potash is applied.

| | |
|---|---|
| 1 | Pre-condenser |
| 2 | Material (an aqueous caustic potash solution) |
| 3 | Steam |
| 4 | Crystallizer provided with a stirrer |
| 5 | Centrifugal separator |
| 6 | Rinsing liquid |
| 7 | Highly pure caustic potash crystals |
| 8 | Mother liquid |
| 9 | Highly pure caustic potash crystal-dissolving tank |
| 10 | Mother liquid-holding tank |
| 11 | Low temperature cooling water |
| 12 | Steam condenser |
| 13 | Low temperature cooling water-holding tank |
| 14 | Steam |
| 15 | Ejector |
| 16 | Cooling water |
| 17 | Ejector mixer |
| 18 | Vacuum pump |

BEST MODE FOR CARRYING OUT THE INVENTION

In the following, the method of the present invention of producing highly pure caustic potash is described, with referring to FIG. 1. However, the present invention is not intended to be limited to those explanations. Herein, in the present invention, "%" represents weight %, "ppm" represents ppm (wt/wt), and "ppb" represents ppb (wt/wt).

FIG. 1 is a schematic diagram showing an example of the steps in the method of producing highly pure caustic potash according to the present invention. When an aqueous caustic potash solution (material 2) is introduced into a crystallizer 4 provided with a stirrer, in the case where a 48% product, which is easily available on the market, is used as the material, it is preferable to use a pre-condenser 1, for the purpose, for example, to increase the efficiency. That is, the 48% product is introduced into the pre-condenser 1 as the material 2. The pre-condenser 1 is heated using steam 3, to vaporize water through a reduced-pressure line. The condensed product (condensate 1) is introduced into the crystallizer 4 provided with a stirrer. The crystallizer 4 provided with a stirrer heats the condensate using steam 3, to vaporize water from the condensate 1 through a reduced-pressure line, thereby to conduct concentration. Then, caustic potash monohydrate crystals (for example, with a particle diameter of approximately 1 mm to 2 mm) deposits in the crystallizer 4, and the condensate is concentrated to have an appropriate slurry concentration. Thus, the slurry is taken into a centrifugal separator 5. The slurry is separated into crystals 7 and a mother liquid 8, using this centrifugal separator 5. The crystals in this centrifugal separator 5 are rinsed with a rinsing liquid 6, so that the mother liquid adhered to the surroundings of the crystals would be washed off. This rinsing liquid can be reused together with the mother liquid. The thus-rinsed crystals 7 may be dissolved in a highly pure caustic potash crystal-dissolving tank 9 appropriately at a necessary concentration, or they may be used as a crystal product. In most cases, the caustic potash is dissolved and diluted so that the concentration of the solution would be 48% to 49%, which is the concentration of products on the market; but there are some cases where the application requires a higher concentration than this, or it is dissolved so that the concentration is approximately 49% to 57% for further purification. In the case where further purification is carried out, it is possible to supply a solution in a range from 57% to 65%, specifically, by carrying out heating for prevention of crystallization.

In FIG. 1, 11 to 18 indicate devices for reducing pressure. The water vapor generated in the crystallizer 4 is brought into contact with a low temperature cooling water 11 in a steam condenser 12, for condensation. The thus-condensed water is placed in a low temperature cooling water-holding tank 13, and then it can be reused as recycled low temperature cooling water 11, by using a refrigerator or the like.

The purity can be further increased by repeating the above-described operation for increasing the purity. For example, a plurality of crystallizers each provided with a stirrer are prepared, and highly pure purified caustic potash can be obtained through purification in many stages. That is, the caustic potash solution obtained in the caustic potash crystal-dissolving tank 9 may be sent to the next condenser or crystallizer. Further, in the modification of these, after the liquid in the crystallizer 4 system has once removed, the solution in the caustic potash crystal-dissolving tank 9, which has once been purified, may be used as the material 2, and thus, the caustic potash can be further purified.

In the case where the impurity concentration of the mother liquid or the rinsing liquid has a predetermined value or lower, the liquid may be mixed with the material 2, for reusing.

Highly pure caustic potash has various standards in terms of the impurity concentration, depending on the applications. Further, the concentration of the highly pure caustic potash when handled differs from each other, depending on the various applications. Taking those into consideration, in the method of the present invention of producing highly pure caustic potash, the concentration of caustic potash is described by converting it into 48% via calculation. Further, the impurity concentration is also described after converting it to those in caustic potash of concentration 48% by calculation. As a result, highly pure caustic potash obtained according to the production method of the present invention can have a sodium content of 10 mg/kg or less and a chlorine content of 1 mg/kg or less when calculated in terms of the weight of potassium chloride.

It is presumed that sodium exist as sodium ion (that is, in the form of NaOH, NaCl, or the like), and chlorine exists as chloride ion (that is, in the form of KCl, NaCl, or the like). Thus, in the present invention, the contents of sodium and chlorine are represented by the values converted to sodium (that is, calculated as sodium atom) and potassium chloride. That is, one having a caustic potash concentration of 48% where Na is 10 mg/kg and KCl is 1 mg/kg, and one having a caustic potash concentration of 96% where Na is 20 mg/kg and KCl is 2 mg/kg are the same, though the concentrations of caustic potash are different from each other.

Caustic potash whose concentration is within a range from 20% to 99% is widely used, and liquid products whose concentration is 40% to 57% and solid products whose concentration is 95% to 98% are widespread on the market. Therefore, it is particularly preferable for the highly pure caustic potash according to the present invention to be provided in such a form.

When comparing the efficiency upon purification of caustic potash among various types of purification, the present inventors found that a method for directly purifying caustic potash is most efficient, and that a method for depositing a slurry containing caustic potash monohydrate crystals from an aqueous caustic potash solution in a high temperature state is most efficient. In the purifying method according to the present invention, in which an aqueous caustic potash solution of caustic potash concentration 48% is to be a standard, it is preferable to use the aqueous caustic potash solution having a sodium content of 200 mg/kg or less and a chlorine content of 15 mg/kg or less when calculated in terms of a weight of KCl, and it is more preferable to use the aqueous caustic potash solution having a sodium content of 190 mg/kg or less and a chlorine content of 15 mg/kg or less when calculated in terms of a weight of KCl, in view of a better efficiency in purification. In the present invention, it is not preferable to use, as a material, an aqueous caustic potash solution with a sodium content of more than 200 mg/kg and/or a chlorine content of more than 15 mg/kg when calculated in terms of a weight of KCl, because the target highly pure caustic potash may not be obtained or a further purification operation may become necessary in some cases. Further, although there is a method of depositing caustic potash by cooling, the efficiency in removing impurities is poor and the target quality of the product cannot be obtained. Therefore, a further purification operation becomes necessary to obtain highly pure caustic potash. Alternatively, the material has a sodium content of more than 10 mg/kg and/or a chlorine content of more than 1 mg/kg when calculated in terms of KCl.

The iron content in the highly pure caustic potash according to the present invention is preferably 1 ppb or higher but 50 ppb or lower for the value when the caustic potash concentration is converted by calculation to be 48% (hereinafter, similarly the values are those when the caustic potash concentration is converted by calculation to be 48%), it is more preferably 20 ppb or lower, and further preferably 15 ppb or lower. When the iron content in the caustic potash is within that range, the performance required in the field of electronic materials and the like can be met.

The chromium content in the highly pure caustic potash according to the present invention is preferably 0.1 ppb or higher but 20 ppb or lower, more preferably 10 ppb or lower, and further preferably 5 ppb or lower. When the chromium content in the caustic potash is within that range, the performance required in the field of electronic materials and the like can be met.

The nickel content in the highly pure caustic potash according to the present invention is preferably 0.1 ppb or higher but 10 ppb or lower, more preferably 5 ppb or lower, and further preferably 4 ppb or lower. When the nickel content in the caustic potash is within that range, the performance required in the field of electronic materials and the like can be met.

The copper content in the highly pure caustic potash according to the present invention is preferably 0.1 ppb or higher but 10 ppb or lower, more preferably 5 ppb or lower. When the copper content in the caustic potash is within that range, the performance required in the field of electronic materials and the like can be met.

The zinc content in the highly pure caustic potash according to the present invention is preferably 1 ppb or higher but 20 ppb or lower, more preferably 15 ppb or lower. When the zinc content in the caustic potash is within that range, the performance required in the field of electronic materials and the like can be met.

That is, the highly pure caustic potash according to the present invention is preferably one having an iron content of 50 ppb or lower, and a chromium content of 20 ppb or lower; and a nickel content of 10 ppb or lower and/or a copper content of 10 ppb or lower and/or a zinc content of 20 ppb or lower.

The apparatus for maintaining a high temperature state (hereinafter, referred to as a crystallizer) is preferably one provided with a stirrer, in order to prevent involvement of the mother liquid due to bonding between slurries to generate. The above-described pre-condensation and crystallization device are preferably conducted under a reduced-pressure condition, for the handling temperature to be within a practical range.

In the case where the pressure is reduced in the pre-condenser and the crystallizer, the pressure may be reduced under the same condition or under conditions different from each other. These reduced-pressure conditions differ, depending on the temperature of the solution in the pre-condenser and the temperature of the solution in the crystallizer. That is, the reduced-pressure conditions are determined, taking the temperature of the solution, the degree of reduction of pressure, and the rate of deposition of the caustic potash monohydrate crystals into consideration, and it is preferable that the solution in interest is condensed in the pre-condenser immediately before the formation of crystals.

In the present invention, the temperature of the aqueous caustic potash solution in the crystallizer is preferably higher than 70° C., more preferably higher than 90° C., and further preferably higher than 95° C., and it is preferably not higher than 150° C., more preferably not higher than 120° C., and further preferably not higher than 110° C. When the temperature is 70° C. or lower, it becomes necessary to reduce, further, the degree of reduction of pressure, in order to concentrate the aqueous caustic potash solution to crystallize caustic potash, and thus the apparatus cost becomes high, which is disadvantageous. Further, when it is 90° C. or lower, the effects of removing impurities, such as sodium, may become poor in some cases, due to such troubles as bumping and clogging in a vacuum line. On the other hand, when it is higher than 150° C., heating is costly and an expensive apparatus is needed in some cases, which is not preferable.

In the present invention, the temperature of the aqueous caustic potash solution to be supplied to a crystallizer after pre-condensation, is preferably approximately the same as the temperature in the crystallizer. Accordingly, the same temperature can be achieved through the same operation in the case where the pre-condenser and the crystallizer have approximately the same pressure.

In the present invention, the caustic potash concentration in the mother liquid in the crystallizer is preferably 57% to 70%, more preferably 60% to 70%, further preferably 61% to 70%, and most preferably 62% to 65%, as a condition for purification. When the caustic potash concentration in the mother liquid is outside of this range, removal of impurities, such as sodium, may become insufficient in some cases, which is not preferable. The preferable caustic potash concentration in the mother liquid may differ, depending on the temperature of the liquid in the crystallizer, and thus there is a respective preferable caustic potash concentration for each temperature of the liquid.

It is necessary to maintain an appropriate state of water vaporization, in the pre-condenser and the crystallizer.

It is preferable to operate the pre-condenser, under such conditions that no slurry is generated. That is, in the pre-condenser, a state of excessive vaporization is not preferable, since impurities may adhere to the inner walls in the gas phase portion, the thus-adhering impurities may drop into the solution, to mix into the slurry, and thus the purity of the caustic potash to be obtained be lowered, in some cases. Further, similarly to the above, it is also not preferable, since substances may adhere in a reduced-pressure line, to result in clogging of the line, in some cases. On the other hand, a state where the degree of vaporization is low in the pre-condenser is not preferable, since concentration becomes slow, making the efficiency in operation lowered. Further, the load in the crystallizer is not large, and the efficiency in operation may become lowered in some cases, which is not preferable.

In the crystallizer, a state of excessive vaporization is not preferable, since impurities may adhere to the inner walls in the gas phase portion, the thus-adhering impurities may drop into the solution, to mix into the slurry, and thus the purity of the caustic potash to be obtained be lowered, in some cases. Further, in the crystallizer, a state of excessive vaporization is also not preferable, since substances may adhere in a reduced-pressure line, to result in clogging of the line, in some cases. On the other hand, a state where the degree of vaporization is low in the crystallizer is not preferable, since concentration becomes slow, making the efficiency in operation lowered.

The slurry concentration in the crystallizer is preferably 5% to 40%, more preferably 10% to 35%, and further preferably 15% to 30%. When the slurry concentration exceeds 40%, the viscosity may become too high and the slurry liquid may not be smoothly taken out from the crystallizer in some cases, which is not preferable. Further, in the case of less than 5%, the amount of crystals is small, making the efficiency poor, which is not preferable.

The average retention time in the crystallizer is preferably 1 hour or more, more preferably 2 hours or more. Further, it is preferably less than 6 hours, more preferably less than 5 hours, and further preferably less than 3 hours. When the average retention time in the crystallizer is less than 1 hour, impurities may be taken into the monohydrate crystals, which is not preferable. On the other hand, when SV in the crystallizer exceeds 6 hours, the efficiency in production becomes poor, which is not preferable.

To generate the reduced-pressure conditions, a known vacuum generator can be used. A water vapor condenser may be used, in order to enhance the performance of the vacuum generator.

To the production method of the present invention, a steam type ejector or a vacuum pump can be applied, and such a structure can be provided that the apparatus is not damaged by the caustic potash mist in condensation and the apparatus does not undergo such troubles as clogging in pipes due to the mist accumulated after use over a long period of time.

As the material for use in the crystallizer, any material can be used as long as it is not corroded by an aqueous caustic potash solution, and it is preferred to use a nickel material, a silver material, a gold material, a stainless steel containing nickel at a high content, polytetrafluoroethylene, or polysulfone, from the viewpoint of corrosion resistance. These materials may be combined for use. Polytetrafluoroethylene and polysulfone may be used as they are or as a coating material, and it is preferable to use any of those as a coating material. A nickel material is further preferable as the material for use in the crystallizer, taking the mechanical strength under reduced pressure, the resistance to heat, and the corrosion resistance into consideration. There are a variety of alloys as stipulated, for example, in JIS (Japan Industrial Standard), but the nickel material represents any of alloys containing no less than 80% of nickel or pure nickel (for example, those which meet the standard of JIS H 4551). The stainless steel containing nickel at a high content means a stainless steel alloy containing not less than 30% but less than 80% of nickel.

To the crystallizer that can be used in the production method of the present invention, it is preferable to attach a pre-condenser, for reducing the load in operation of the crystallizer and simplifying the form thereof. Any material can be used for the pre-condenser, as long as the material is not corroded by an aqueous caustic potash solution, and it is preferably a stainless steel alloy containing 15% or more of nickel, such as SUS310S; a nickel material, polytetrafluoroethylene, or polysulfone, more preferably a stainless steel alloy containing 30% or more of nickel, or a nickel material. Polytetrafluoroethylene or polysulfone may be used as they are or as a coating material, and it is preferable to use any of these as a coating material. When the pre-condenser is controlled under the same pressure as the crystallizer, it is preferable to use the same material as for the crystallizer.

As the material for a device or part, which is not subjected to heating, e.g. the dissolving tank, the mother liquid-holding tank, and the like, use may be made, for example, of polyethylene or polypropylene, in addition to the above-described ones. These synthetic resins each can also be used as a coating material.

The slurry formed in the crystallizer is divided into crystals and the mother liquid, through a solid-liquid separating operation. Thus, it is extremely important to remove the mother liquid that adheres to the surroundings of the crystals, in order to increase the purity. This is because even a slight adhesion may quite largely affect the purified product to be finally obtained, when the difference in the concentration of impurities between the crystals and the mother liquid is larger. It is preferable to rinse the thus-separated-off crystals with water or an aqueous caustic potash solution. As the water or aqueous caustic potash solution for use in rinsing, any of those can be used as long as it does not lower the purity of the highly pure caustic potash to be obtained. Examples of the preferable water include ion exchanged water, ultrapure water, and reverse osmosis membrane water (i.e. water treated through a reverse osmosis membrane). Examples of the aqueous caustic potash solution include highly pure aqueous caustic potash solutions.

Although the quality of the caustic potash to be obtained may increase through rinsing, it is not preferable that the amount of liquid for use in rinsing is too large, which results in a low yield. The amount of water for rinsing is preferably 1/3 to 1/200 times, more preferably 1/3 to 1/100 times, and further preferably 1/10 to 1/30 times the amount of the thus-obtained crystals. When the amount for rinsing exceeds 1/3 time the amount of the crystals, loss of crystals due to dissolving becomes large, which is not preferable. On the other hand, when the amount for rinsing is less than 1/200 times the amount of the crystals, the effects of rinsing may not be obtained, which is not preferable.

The thus-rinsed crystals may be subjected to drying, to use as crystals, or alternatively they may be used in a form of aqueous solution. In the production method of the present invention, it is preferred to take out the crystals in a form of aqueous solution. As the water for preparing a highly pure aqueous caustic potash solution, any water may be used as long as it do not lower the purity; and examples thereof include ion exchanged water, ultrapure water, and reverse osmosis membrane water, and it is preferably ultrapure water, or reverse osmosis membrane water.

Before using, the mother liquid may be mixed into the aqueous caustic potash solution that has been used as the material. However, in such a case, when the mother liquid is recycled, the amount of impurities in the material increases. Therefore, it is preferable to monitor the concentration of the impurities in the mother liquid and stop mixing the mother liquid into the material at the point once the impurity concentration exceeds a predetermined value. That is, since a part of the mother liquid may be reused as a material liquid, it is appropriate for the mother liquid to have amounts of impurities less than those of the material. Thus, when the caustic potash concentration in the mother liquid is higher than that in the material liquid, the aforementioned operation can increase the effects of reducing energy consumption in pre-condensation and also increase the ratio of collection of the material. Further, in the case where only some impurities are the object of purification, for example, when the iron concentration in the mother liquid exceeds 500 ppb, a resultant appropriate procedure to be taken may be to stop recycling the mother liquid. Further, as indices for recycling, the sodium concentration, the chlorine concentration, the copper concentration, the nickel concentration, or the zinc concentration may be used, and a plurality of impurities from among the above may be combined for the judgment.

The liquid in which the crystals have been rinsed may be mixed into the aqueous caustic potash solution used as the material in the same manner as above, or it may be put in a crystallizer provided with a condensing function and then be used. In this case also, the system may be operated in the same manner as in the above-described recycling of the mother liquid.

EMBODIMENTS

Highly pure caustic potash, with coexistent impurities of an iron content of 50 ppb or lower and a chromium content of 20 ppb or lower, in which a caustic potash concentration of 48% is to be a standard.

Highly pure caustic potash, with coexistent impurities of an iron content of 50 ppb or lower, a chromium content of 20 ppb or lower, a sodium content of 10 mg/kg or lower, and chlorine of 1 mg/kg or lower when calculated in terms of a weight of potassium chloride, in which a caustic potash concentration of 48% is to be a standard.

A method of producing highly pure caustic potash, comprising the steps of:

concentrating an aqueous caustic potash solution in a high temperature state, thereby to allow caustic potash monohydrate crystals to be deposited;

separating the crystals and the mother liquid off from a slurry containing said monohydrate crystals; and rinsing the crystals with water or an aqueous caustic potash solution.

A method of producing highly pure caustic potash, comprising the steps of:

concentrating an aqueous caustic potash solution in a state of higher than 70° C. but not higher than 150° C., to bring the caustic potash concentration to 57 to 70%, thereby to allow caustic potash monohydrate crystals to be deposited;

separating the crystals and the mother liquid off from a slurry containing said monohydrate crystals; and rinsing the crystals with water or an aqueous caustic potash solution.

A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% is to be a standard, in a state of higher than 70° C. but not higher than 150° C., thereby to allow caustic potash monohydrate crystals to be deposited;

separating the crystals and the mother liquid off from a slurry containing said monohydrate crystals; and rinsing the crystals with water or an aqueous caustic potash solution.

A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% is to be a standard, in a high temperature state, to bring the caustic potash concentration to 57 to 70%, thereby to allow caustic potash monohydrate crystals to be deposited;

separating the crystals and the mother liquid off from a slurry containing said monohydrate crystals; and rinsing the crystals with water or an aqueous caustic potash solution.

A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% is to be a standard, in a state of higher than 70° C. but not higher than 150° C., to bring the caustic potash concentration to 57 to 70%, thereby to allow caustic potash monohydrate crystals to be deposited;

separating the crystals and the mother liquid off from a slurry containing said monohydrate crystals; and rinsing the crystals with water or an aqueous caustic potash solution.

A method of producing highly pure caustic potash, comprising the steps of:

concentrating an aqueous caustic potash solution in a high temperature state, thereby to allow caustic potash monohydrate crystals to be deposited;

separating the crystals and the mother liquid off from a slurry containing said monohydrate crystals; and rinsing the crystals with water or an aqueous caustic potash solution, wherein the material of a vessel in which the slurry containing said caustic potash monohydrate crystals is to be deposited, is a nickel material, a silver material, a gold material, a stainless steel containing nickel at a high content, polysulfone, and/or polytetrafluoroethylene.

A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% by weight is to be a standard, in a high temperature state, thereby to allow caustic potash monohydrate crystals to be deposited;

separating the crystals and the mother liquid off from a slurry containing said monohydrate crystals; and rinsing the crystals with water or an aqueous caustic potash solution, wherein the material of a vessel in which the slurry containing said caustic potash monohydrate crystals is to be deposited, is a nickel material, a silver material, a gold material, a stainless steel containing nickel at a high content, polysulfone, and/or polytetrafluoroethylene.

A method of producing highly pure caustic potash, comprising the steps of:

concentrating an aqueous caustic potash solution in a state of higher than 70° C. but not higher than 150° C., to bring the caustic potash concentration to 57 to 70% by weight, thereby to allow a slurry containing caustic potash monohydrate crystals to be deposited;

separating the crystals and the mother liquid off from the slurry; and rinsing the crystals with water or an aqueous caustic potash solution, wherein the material of a vessel in which the slurry containing said caustic potash monohydrate crystals is to be deposited, is a nickel material, a silver material, a gold material, a stainless steel containing nickel at a high content, polysulfone, and/or polytetrafluoroethylene.

A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% by weight is to be a standard, in a state of higher than 70° C. but not higher than 150° C., thereby to allow a slurry containing caustic potash monohydrate crystals to be deposited;

separating the crystals and the mother liquid off from the slurry; and rinsing the crystals with water or an aqueous caustic potash solution, wherein the material of a vessel in which the slurry containing said caustic potash monohydrate crystals is to be deposited, is a nickel material, a silver material, a gold material, a stainless steel containing nickel at a high content, polysulfone, and/or polytetrafluoroethylene.

A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% by weight is to be a standard, in a high temperature state, to bring the caustic potash concentration to 57 to 70% by weight, thereby to allow a slurry containing caustic potash monohydrate crystals to be deposited;

separating the crystals and the mother liquid off from the slurry; and rinsing the crystals with water or an aqueous caustic potash solution, wherein the material of a vessel in which the slurry containing said caustic potash monohydrate crystals is to be deposited, is a nickel material, a silver material, a gold material, a stainless steel containing nickel at a high content, polysulfone, and/or polytetrafluoroethylene.

A method of producing highly pure caustic potash, comprising the steps of:

concentrating an aqueous caustic potash solution having a sodium content of 200 mg/kg or less and a chlorine content of 15 mg/kg or less when calculated in terms of a weight of potassium chloride, in which a caustic potash concentration of 48% by weight is to be a standard, in a state of higher than 70° C. but not higher than 150° C., to bring the caustic potash concentration to 57 to 70% by weight, thereby to allow a slurry containing caustic potash monohydrate crystals to be deposited;

separating the crystals and the mother liquid off from the slurry; and rinsing the crystals with water or an aqueous caustic potash solution, wherein the material of a vessel in which the slurry containing said caustic potash monohydrate crystals is to be deposited, is a nickel material, a silver material, a gold material, a stainless steel containing nickel at a high content, polysulfone, and/or polytetrafluoroethylene.

EXAMPLES

The present invention will be described in more detail based on examples and comparative examples given below, but the invention is not meant to be limited by those.

In the analyses, measurements were carried out using the following methods. Chlorine was measured through absorptiometric analysis, after formation of a complex with mercury (II) thiocyanate, and then the resultant value was converted by calculation to a value in terms of a weight of potassium chloride. The Na concentration was measured through ICP emission spectrometry, after dilution with ultrapure water. The potassium hydroxide concentration was found by a neutralization titration method using hydrochloric acid (a mixed indicator of methyl red and methyl blue was used as an indicator). The concentrations of chromium, nickel, copper, and zinc each were measured through ICP-MS, by forming a complex of the respective metal with diethyldithiocarbamic acid, and then extracting the resultant complex with n-butyl acetate ester. Further, the iron concentration was found through absorptiometric analysis, by forming a complex with bathophenanthroline, and then extracting the complex with isoamyl alcohol.

Example 1

1,000 g of a 48.5% aqueous caustic potash solution (material) containing 39.6 ppm of sodium and 1.0 ppm of chlorine when calculated in terms of a weight of potassium chloride, was condensed, to give an aqueous caustic potash solution of 61%, and the resultant solution was placed in a tank that had a lining with a nickel material and that was provided with a stirrer. Then, the pressure was adjusted so that the aqueous caustic potash solution placed in that tank would become of a boiling state at 100° C., followed by condensation, to obtain a slurry containing caustic potash monohydrate crystals. From the resultant slurry, the insoluble matters were taken out through centrifugal separation, and then washed with ultrapure water whose amount was 1/20 times that of the thus-taken out insoluble matters, thereby to obtain highly pure caustic potash monohydrate crystals. Then, the resultant highly pure caustic potash monohydrate crystals were dissolved in ultrapure water so that the concentration would be 48.5%.

As a result, 650 g (yield 65%) of a 48.5% aqueous highly pure caustic potash solution was obtained. With respect to the resultant solution, sodium and chlorine were analyzed, and the results are shown in Table 1. Further, the iron ion amount (Fe), the copper ion amount (Cu), the nickel ion amount (Ni), the chromium ion amount (Cr), and the zinc ion amount (Zn) were analyzed, and the results are shown in Table 2. In Tables 1 and 2, the values shown are those when the caustic potash concentration was converted by calculation into 48.0%.

Example 2

Highly pure caustic potash monohydrate crystals were obtained in the same manner as in Example 1, except that, in place of the aqueous caustic potash solution (material) as used in Example 1, use was made of 1,000 g of a 48.5% aqueous caustic potash solution (material) containing 196 ppm of sodium and 1.0 ppm of chlorine when calculated in terms of a weight of potassium chloride. Then, an aqueous highly pure caustic potash solution, which was obtained by dissolving the thus-obtained monohydrate crystals in ultrapure water, was subjected to the analyses in the same manner as in Example 1. The results are shown in Table 1.

Example 3

Highly pure caustic potash monohydrate crystals were obtained in the same manner as in Example 1, except that the rinsing as in Example 1 was not conducted. Then, an aqueous highly pure caustic potash solution, which was obtained by dissolving the thus-obtained monohydrate crystals in ultrapure water, was subjected to the analyses in the same manner as in Example 1. The results are shown in Table 1.

Comparative Example 1

1,000 g of a 48.5% aqueous caustic potash solution (material) containing 70 ppm of sodium and 1.2 ppm of chlorine when calculated in terms of a weight of potassium chloride, was condensed, to give an aqueous caustic potash solution of 56%. The resultant aqueous caustic potash solution was cooled until the temperature became 0° C., to allow caustic potash crystals to be deposited in a vertical-type double cooling tube. Then, after the mother liquid was taken out therefrom, the double cooling tube was heated to 30° C., while removing the aqueous caustic potash solution which was eluted through sweating (exudation), followed by rinsing the resultant crystals. To the residual crystals, ultrapure water was added, to give an aqueous caustic potash solution of 48.5%. As a result, 504 g (yield 50%) of the 48.5% aqueous caustic potash solution was obtained. Then, the resultant solution was subjected to the analyses in the same manner as in Example 1. The results are shown in Table 1.

Comparative Example 2

1,000 g of a 48.5% aqueous caustic potash solution (material) containing 860 ppm of sodium and 29 ppm of chlorine when calculated in terms of a weight of potassium chloride, was condensed to 60%, and the resultant solution was placed in the tank same as that in Example 1. Then, the pressure was adjusted so that the solution placed in that tank would become of a boiling state at 80° C., followed by condensation, to allow a slurry containing caustic potash crystals to be deposited. From the resultant slurry, the insoluble matters were taken out through centrifugal separation, and then washed with ultrapure water whose amount was 1/100 times that of the thus-taken out insoluble matters, thereby to obtain caustic potash. Then, the resultant caustic potash was subjected to the analyses in the same manner as above. The results are shown in Table 1.

TABLE 1

| | | Example 1 | Example 2 | Example 3 | Comparative example 1 | Comparative example 2 |
|---|---|---|---|---|---|---|
| Material | Na concentration (ppm) | 39.6 | 194 | 39.6 | 70 | 860 |
| | KCl concentration (ppm) | 1.0 | 1.0 | — | 1.2 | 29 |
| Highly pure aqueous caustic potash solution | KOH yield (%) | 65 | 65 | 65 | 50.4 | 70 |
| | Na concentration (ppm) | 1.7 | 7.8 | 7.7 | 18 | 50 |
| | KCl concentration (ppm) | 0.3 | 0.3 | — | 0.8 | 4.4 |

TABLE 2

| | Fe (ppb) | Cu (ppb) | Ni (ppb) | Cr (ppb) | Zn (ppb) |
|---|---|---|---|---|---|
| Material | 98 | 7 | 5 | 22 | 21 |
| Mother liquid | 320 | 46 | 23 | 50 | 35 |
| Highly pure aqueous caustic potash solution | 15 | 5 | <5 | <5 | <10 |

It can be seen from Table 1 that highly purified caustic potash was obtained with a high yield in Examples 1 and 2. In Comparative Example 1, almost the similar material was processed but with a different method, and the purification degree as in Example 1 was not achieved. Furthermore, when the material whose Na content was at a lower level than in Example 2 was used, sufficient purification was not achieved. It can be understood from the above that the producing method of the present invention is excellent, when comparing with the comparative examples in view of both of the higher purity to attain and the yield. Further, according to the producing method of the present invention, coexisting chlorine can be removed in a further higher degree, and a high level of purification can be achieved with respect to heavy metals, as shown in Table 2.

Example 4

A mother liquid and a rinsing liquid were obtained, through the operation in the same manner as in Example 1. The resultant mother liquid and rinsing liquid were subjected to analyses of the concentration and impurities. Further, the mother liquid and the rinsing liquid were condensed, and the resultant condensate was introduced into a crystallizer as a material, to obtain highly pure caustic potash monohydrate crystals. The mother liquid and the rinsing liquid may not be used as the material, depending on the results in impurity analysis.

INDUSTRIAL APPLICABILITY

The highly pure caustic potash that can be obtained by the producing method of the present invention, can be used, for example, for battery/cell materials, electronic materials, medical and pharmaceutical products, production of various types of potassium salts, cosmetics, and analysis reagents, each of which require high purity thereof.

The invention claimed is:

1. A method of producing highly pure caustic potash, comprising the steps of:
concentrating an aqueous caustic potash solution having a sodium content of 200 mg/kg or less and a chlorine content of 15 mg/kg or less when calculated in terms of a weight of potassium chloride, in which a caustic potash concentration of 48% is to be a standard, in a high temperature state, thereby to allow caustic potash monohydrate crystals to be deposited; and
isolating the crystals from a slurry containing said monohydrate crystals.

2. The method of producing highly pure caustic potash according to claim 1, wherein the aqueous caustic potash solution has a sodium content of more than 10 mg/kg, in which the caustic potash concentration of 48% is to be a standard.

3. The method of producing highly pure caustic potash according to claim 1, wherein the aqueous caustic potash solution has a chlorine content of more than 1 mg/kg when calculated in terms of a weight of potassium chloride, in which the caustic potash concentration of 48% is to be a standard.

4. The method of producing highly pure caustic potash according to claim 1, wherein the thus-isolated crystals are rinsed with water or an aqueous caustic potash solution.

5. The method of producing highly pure caustic potash according to claim 1, wherein the high temperature state is at a temperature higher than 70° C. but not higher than 150° C.

6. The method of producing highly pure caustic potash according to claim 1, wherein a caustic potash concentration in a mother liquid in a crystallizer is 57% to 70%.

7. The method of producing highly pure caustic potash according to claim 4, wherein the crystals are rinsed with an amount of liquid whose amount is 1/3 to 1/200 times the amount of said crystals.

8. The method of producing highly pure caustic potash according to claim 1, wherein a mother liquid resulting from the slurry containing the monohydrate crystals from which the crystals are separated off is reused, while adjusting the caustic potash concentration to be 49% to 65%.

9. The method of producing highly pure caustic potash according to claim 2, wherein a mother liquid resulting from the slurry containing the monohydrate crystals from which the crystals are separated off is reused, while adjusting the caustic potash concentration to be 49% to 65%.

10. The method of producing highly pure caustic potash according to claim 3, wherein a mother liquid resulting from the slurry containing the monohydrate crystals from which the crystals are separated off is reused, while adjusting the caustic potash concentration to be 49% to 65%.

11. The method of producing highly pure caustic potash according to claim 4, wherein the rinsing liquid is reused, while adjusting the caustic potash concentration to be 49 to 65%.

12. The method of producing highly pure caustic potash according to claim 4, wherein a mother liquid resulting from the slurry containing the monohydrate crystals from which the crystals are separated off, and the rinsing liquid with which the isolated crystals are rinsed with, are reused, while adjusting the caustic potash concentration to be 49% to 65%.

* * * * *